United States Patent [19]

Carlstrom et al.

[11] 4,223,068
[45] Sep. 16, 1980

[54] RIGID POLYURETHANE FOAM CONTAINING POLYESTER RESIDUE DIGESTION PRODUCT AND BUILDING PANEL MADE THEREFROM

[75] Inventors: William L. Carlstrom; Ronald W. Reineck, both of West Bend; Glenn R. Svoboda, Grafton, all of Wis.

[73] Assignee: Freeman Chemical Corporation, Port Washington, Wis.

[21] Appl. No.: 946,323

[22] Filed: Sep. 27, 1978

[51] Int. Cl.$^2$ .................. C08G 18/14; C08G 18/42; B32B 5/20

[52] U.S. Cl. ........................... 428/310; 260/2.3; 428/313; 428/921; 521/131; 521/171; 521/172; 521/173; 521/903

[58] Field of Search .................. 260/2.3, 131; 521/172-173, 903; 428/310, 313

[56] References Cited

U.S. PATENT DOCUMENTS

| | | | |
|---|---|---|---|
| 2,937,151 | 5/1960 | TenBroeck et al. | 260/2.3 |
| 3,676,376 | 7/1972 | Svoboda et al. | 521/171 |
| 3,983,087 | 9/1976 | Tucker et al. | 260/2.3 |
| 4,020,024 | 4/1977 | Walraevens et al. | 521/171 |
| 4,037,377 | 7/1977 | Howell et al. | 52/595 |
| 4,048,104 | 9/1977 | Svoboda et al. | 260/2.3 |
| 4,069,207 | 1/1978 | Klein | 521/171 |
| 4,115,300 | 9/1978 | Chakirof | 521/171 |

*Primary Examiner*—H. S. Cockeram
*Attorney, Agent, or Firm*—Harry B. Keck; George E. Manias

[57] ABSTRACT

Rigid polyurethane foam is produced from polyisocyanate and polyol wherein 5–30% by weight of the polyol ingredient is a digestion product of polyalkylene terephthalate residues or scraps digested with organic polyols. The resulting rigid polyurethane foam exhibits uniform density and, when compared with a corresponding polyurethane foam which does not include the said digestion products, exhibits equivalent or superior physical strength properties. With fire retardant rigid polyurethane foams wherein the organic polyol ingredient includes halogenated organic polyols, use of 5–30% by weight of the said digestion product in the organic polyol ingredient, achieves a rigid fire retardant polyurethane foam having a lower flame spread and a lower smoke generation than a corresponding polyurethane foam which does not include the said digestion product. When fabricated in a closed mold, the present rigid polyurethane foam has a more uniform density, i.e., a higher core density, than corresponding rigid polyurethane foams which do not include the said digestion product.

4 Claims, No Drawings

RIGID POLYURETHANE FOAM CONTAINING POLYESTER RESIDUE DIGESTION PRODUCT AND BUILDING PANEL MADE THEREFROM

BACKGROUND OF THE INVENTION

1. Field of the Invention

This invention relates to rigid polyurethane foams and a method for manufacturing the same.

2. Description of the Prior Art

Rigid polyurethane foam is fabricated from
organic polyisocyanate;
organic polyol;
halogenated alkane blowing agents;
surfactants;
catalysts for the reaction of —OH and —NCO radicals.

Rigid polyurethane foam can be produced by combining the listed ingredients in a free-rise environment or by combining the listed ingredients in a closed mold. When manufactured in a free-rise environment, rigid polyurethane foam is customarily employed as a filler material wherein its compressive strength and shear strength are not usually significant factors. Because the resulting rigid polyurethane foam is intended to be used as a filler, the lowest feasible densities are usually desirable for free-rise foam.

When rigid polyurethane foam is employed in a closed mold, there is a tendency for the material to have a greater density at the skin of the mold than at the interior. The resulting molded foam article has a differential density; the core has a density which may be substantially lower than the skin density.

Where polyurethane foam products are intended for fire retardant applications, it is customary to employ halogenated organic polyols, at least in part, as a component of the organic polyol ingredients. The resulting rigid polyurethane foam is evaluated by ASTM E84 to determine its flame spread and smoke generation properties.

Rigid polyurethane foam products have included a variety of organic polyol ingredients including polyethers, polyesters and mixtures thereof.

The use of a polyalkylene terephthalate digestion product in flexible polyurethane foam is described in U.S. Pat. No. 4,048,104. Therein, the digestion product and its preparation are described. However in that instance the digestion product is employed to prepare polyisocyanate prepolymers—and not as a polyol ingredient in the fabrication of flexible polyurethane foam.

STATEMENT OF THE INVENTION

A principal object of this invention is to provide a rigid polyurethane foam and method for making the same which has, for the same overall density as a corresponding rigid polyurethane foam of the prior art, equivalent or superior strength properties.

A converse object of the invention is to produce a rigid polyurethane foam which has, for the same strength properties as a corresponding rigid polyurethane foam of the prior art, a lower overall density.

A further object of the invention is to provide a molded rigid polyurethane foam containing from 5 to 30 percent of its weight in the form of a polyalkylene terephthalate digestion product wherein the molded foam will have a higher core density than a corresponding polyurethane foam fabricated to the same overall density from identical ingredients except for the said digestion product.

A further object of this invention is to prepare a fire retardant rigid polyurethane foam wherein the organic polyol ingredient includes polyhalogenated polyol and also includes from 5 to 30 percent of its weight in the form of the polyalkylene terephthalate digestion product and wherein the resulting rigid fire retardant foam has a lower flame spread and lower smoke generation than a corresponding foam prepared from the same ingredients except for the said digestion product.

A further object of the invention is to provide a polyurethane foam which can be molded to produce a rigid flame retardant polyurethane foam having a flame spread less than 25 and a smoke generation less than 450 in the ASTM E84 test.

A particular related object is to provide a rigid polyurethane foam having a flame spread less than 25 and a smoke generation less than 100 in the ASTM E84 test.

A still further object of this invention is to provide a double metal (or other incombustible material) skin, rigid polyurethane foam core construction panel having a flame spread less than 25 and a smoke generation has than 100 in the ASTM E84 test.

A particular related object is to provide a double metal (or other combustible material) skin, rigid polyurethane foam core construction panel having a flame spread less than 25 and a smoke generation less than 25 in the ASTM E84 test.

According to the invention, in its broadest embodiment, polyurethane foam is prepared by combining
organic polyisocyanate;
organic polyol;
halogenated alkane blowing agent;
surfactant;
catalyst for the reaction of —OH and —NCO radicals.

The organic polyol ingredient includes 5 to 30 percent of its weight of a digestion product of polyalkylene terephthalate which is obtained by digesting polyalkylene terephthalate having a molecular weight greater than 15,000 in a reactive solvent selected from the class consisting of organic diols and triols having a molecular weight from 62 to 500 until the digestion product is soluble in acetone at room temperature. By including this digestion product in the organic polyol ingredient of the polyurethane foam, the resulting polyurethane foam in a free-rise fabrication will have a lower density than a corresponding rigid polyurethane foam fabricated from the same ingredients except for the polyalkylene terephthalate digestion product. An alternative comparison is between (a) the rigid polyurethane foam obtained from a polyol mixture containing 5 to 30 percent by weight of the digestion product with (b) the rigid polyurethane foam obtained from corresponding ingredients without the said digestion product, wherein both foams (a) and (b) are formulated to the same overall density. In this circumstance, the polyurethane foam (a) which contains the said digestion product will have a greater compression strength and shear strength than the corresponding foam (b).

When the rigid polyurethane foam forming ingredients are fabricated in a closed mold according to this invention, the rigid foam which contains the said digestion product will have a more uniform density, i.e., a higher core density, than a corresponding rigid foam of the same overall density which does not contain the digestion product.

When fire retardant rigid polyurethane foams are prepared, a foam containing 5 to 30 percent of the organic polyol in the form of the digestion product will have a lower flame spread and a lower smoke generation, ASTM test E84, than a corresponding rigid polyurethane foam which does not contain the digestion product.

A building construction panel, fabricated in accordance with U.S. Pat. No. 4,037,377, and containing a fire retardant polyol composition as herein set forth can achieve a flame spread of 20 and a smoke generation of 15 when tested in ASTM E84.

DESCRIPTION OF THE PREFERRED EMBODIMENT(S)

In its broadest embodiment the present invention concerns polyurethane foams, both fire retardant foams and others. Rigid polyurethane foams are prepared by combining the following ingredients:

an organic polyisocyanate—which can be a monomeric polyisocyanate, a polymeric polyisocyanate or a polyisocyanate prepolymer;

an organic polyol which may be a polyether, a polyester, a mixed polyether-polyester, or a mixture of polyethers and polyesters;

a halogenated alkane blowing agent such as trichlorofluoro methane;

a surfactant, usually an alkoxylated silicone;

a catalyst for the reaction of —OH and —NCO radicals, usually an amine or a tin catalyst.

Polyalkylene terephthalate polymers, principally polyethylene terephthalate polymers, are available in the form of photographic films and synthetic fibers. Waste or scrap films and fibers of polyethylene terephthalate are inexpensively available. In addition polyalkylene terephthalate polymers are available as sludges which are obtained as by-products from polyalkylene terephthalate manufacturing plants. In all cases the polyalkylene terephthalate contains recurring units of

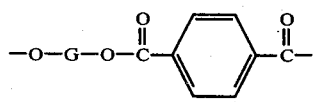

wherein G represents a divalent organic radical containing from 2 to 10 carbon atoms attached to the adjacent oxygen atoms by saturated carbon atoms. The molecular weight of such polyalkylene terephthalate polymers is greater than 15,000, frequently greater than 100,000. According to the present invention such polyalkylene terephthalate polymers are digested with low molecular weight polyols selected from the class consisting of diols and triols. Typical diols include ethylene glycol, propylene glycol, butylene glycol, diethylene glycol, polyethylene glycol, dipropylene glycol, polypropylene glycol, other alkylene glycols and glycol ethers, hydroxy-terminated polyesters, bis(2-hydroxyethoxyethyl) glutarate, bis(2-hydroxy-ethyl) terephthalate, and in general any hydroxy-terminated ether, ester or mixed etherester having a molecular weight of 500 or less. The digesting polyol can be aliphatic or aromatic. The digesting polyol may include substituents which are inert in the digestion reaction, for example, chlorine or bromine substituents.

A preferred digesting polyol is bis(2-hydroxy-ethoxyethyl) glutarate. The glutarate may be prepared initially by transesterification of diethylene glycol and dimethyl glutarate. Alternatively the glutarate may be made by transesterification contemporaneously with the desired digestion by combining the polyalkylene terephthalate digested by heating the polymer at temperatures from about 200°–250° C. for several hours with the selected digesting polyol solvent. The digestion is carried out in a nitrogen atmosphere to minimize oxidation reactions. Periodically samples are taken from the digestion kettle and deposited in acetone at room temperature. The digestion process is considered to be complete when the sample digested product is soluble in the acetone. After completion of the digestion, the reaction kettle contents are allowed to cool and may be used directly or may be stored in suitable containers such as metal cans.

While the digestion product of polyalkylene terephthalate is soluble in acetone, it may be possible to produce the acetone soluble digestion product by observing the changes in viscosity and/or acid value of the materials in the digestion process, without actually carrying out an acetone solubility test.

Some polyalkylene terephthalate materials contain dispersed solids which can be catalyst particles (left over from the processing by which the terephthalate was produced); or may be insoluble fragments of other organic films which have been incompletely separated from the terephthalate; or may be pigments or other foreign substances. Such dispersed solids may remain in the digestion product, so long as they are substantially inert in the subsequent preparation of rigid polyurethane foam. Such dispersed substances, in general, are not soluble in acetone and their presence in an acetone solution of the digested polyol may create cloudiness.

For the purposes of the present invention in its broadest scope, the digestion product constitutes 5 to 30 percent of the weight of the organic polyol ingredient. Appropriate revisions must be made to satisfy the stoichiometric requirements of the urethane reaction—the reaction between the —NCO radicals of the polyisocyanate and the —OH radicals of the organic polyol. Apart from that adjustment, the polyurethane reaction is carried out exactly in the same manner that it would be carried out for making any other rigid polyurethane foam. The ingredients may be mixed in advance—at least in those instances where the digestion product is compatible with the other organic polyols and halogenated alkane blowing agent. In those instances where the digestion product is not compatible with the remaining organic polyols, the polyurethane reaction may be carried out by combining three ingredient streams, namely, the polyisocyanate stream, the digestion product stream and the remaining organic polyols as a separate stream. The halogenated alkane blowing agent and surfactant may be included in any or all of the three streams. The catalyst may be added in any stream which does not contain isocyanate groups. The polyurethane foam may employ spray techniques, pouring techniques or frothing techniques, all of which are well-known in the polyurethane foam art.

EXAMPLE 1

PRIOR ART

A rigid polyurethane foam was prepared by combining the following ingredients as a polyol mixture:

75 grams Multranol-E9136, a polyoxypropylene aromatic amine having a hydroxyl value of 480;

5 grams Fyrol-6, a halogen-containing polyol having the following structural formula

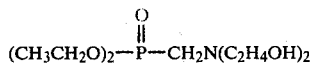
$$(CH_3CH_2O)_2-\overset{\overset{O}{\|}}{P}-CH_2N(C_2H_4OH)_2$$

1 gram surfactant, alkoxylated silcone;
1 gram dimethyl ethanol amine, catalyst;
0.35 grams triethylene diamine (33% by weight in dipropylene glycol solvent) catalyst;
31 grams trichlorofluoro methane (Freon-11).

100 grams of the above-described polyol mixture was combined with 89.5 grams Mondur—MR, a polymethylene polyphenyl polyisocyanate having an —NCO value of 31-32. The mixed materials were allowed to rise freely in an open-top box to produce a rigid polyurethane foam having a density of 1.60 pounds per cubic foot. This rigid foam was identified as foam 1.

EXAMPLE 2

Example 1 was repeated except that the organic polyol was 55 grams of the Multranol E-9136 and 20 grams of the digested polyol described in Example 6 having an —OH value of 220. Also the formulation included 30 grams of trichlorofluoro methane. This mixture was combined with 76 grams Mondur—MR, a stoichiometric equivalent, and allowed to rise freely in an open-top box to produce a rigid polyurethane foam having a density of 1.60 pounds per cubic foot, identified as foam 2.

Foam 1 and foam 2 were compared in compressive strengths parallel to the direction of rise and perpendicular to the direction of rise. The results are set forth in the following Table 1.

TABLE 1

| Foam Example | COMPRESSION TESTS | | |
|---|---|---|---|
| | Density | Parallel To Rise | Perpendicular To Rise |
| 1 | 1.60 pcf | 17.4 psi | 12.5 psi |
| 2 | 1.60 pcf | 27.6 psi | 14.1 psi |

It will be observed that for the same density of product, the foam (Example 2) containing digested polyalkylene terephthalate exhibited greater compressive strength than the corresponding foam (Example 1) which did not contain the digestion product.

EXAMPLE 3

PRIOR ART

A fire retardant rigid polyurethane foam is prepared from the following ingredients:

Polyol Mixture 65.3 grams RF230 which is a trichloro butylene oxide adduct of a starter polyol. The adduct has an —OH value of 365;
13.40 grams of a glycerine-based adduct of propylene oxide capped with ethylene oxide having a molecular weight of about 3000 and a hydroxyl value of 56;
0.30 grams Ferrocene which is dicyclopentadienyliron, used as a smoke suppressant;
1.0 grams surfactant, a polyalkoxylated silicone;
20 grams trichlorofluoro methane (Freon 11).

100 grams of the foregoing polyol mixture is combined with 69 grams of polyphenyl polymethylene polyisocyanate having an —NCO value of 30-31 percent by weight and a catalyst consisting of 1.6 grams of dimethyl cyclohexyl amine. The ingredients were allowed to foam in a closed aluminum mold having a rectangular mold cavity measuring 12"×12"×2". The resulting foam is identified as foam 3.

EXAMPLE 4

The fire retardant polyurethane foam of Example 3 was duplicated except that the polyol mixture contained 59.31 grams RF230 (supra);
20 grams of the digested polyol of Example 6 having an —OH value of 220;
0.84 grams surfactant, the same polyalkoxylated silicone;
1.30 grams catalyst, dimethyl cyclohexyl amine; and
19.85 grams trichlorofluoro methane (Freon 11).

100 grams of the polyol mixture was combined with 72 grams of polyphenyl polymethylene polyisocyanate having an —NCO value of 30-31 percent by weight. The resulting mixture was charged into the same 12"×12"×2" aluminum mold at 100° F. to produce a rigid polyurethane foam, identified as foam 4.

The comparative properties of the foams 3 and 4 are set forth in Table 2.

TABLE 2

| | Foam Example 3 | Foam Example 4 | |
|---|---|---|---|
| | | Sample A | Sample B |
| Overall Density (pounds/cu.ft.) | 3.6 | 3.6 | 3.6 |
| Core Density (pcf) | 2.81 | 2.95 | 2.89 |
| Compression Strength (Room Temp.) psi | 30.2 | 40.2 | 39.5 |
| Compression Strength (130° F.) psi | 29.0 | — | 38.1 |
| Compression Modulus (Room Temp.) | 963 | 1190 | 1363 |
| Compression Modulus (130° F.) | 790 | — | 1194 |
| Peak Exotherm, °F. | 198 | 216 | 218 |

It will be observed from Table 2 that the core density of foam 4 is greater than the core density of foam 3 although the overall density of both examples is the same. It will be observed that the compression strength and modulus are greater for foam 4 than foam 3. Similarly the peak exotherm of foam 4 greatly exceeds the peak exotherm of foam 3 indicating that the polyurethane foam forming reaction occurs more vigorously with foam 4.

The polyol mixture of Example 4 exhibited compatibility—that is, no phase separation occurred when the material was stored for extended periods. As a consequence, a polyurethane foam forming polyol mixture can be prepared so that the polyurethane foam can be produced in conventional two-component systems rather than three or more component systems.

While polyol compatibility was demonstrated in Example 4, it is possible that the polyalkylene terephthalate digestion product might not be compatible with other polyols. In such instances, the benefits of the present invention can be obtained by employing three-component mixing devices for mixing (a) the other polyols; (b) the polyalkylene terephthalate digestion product; (c) the polyisocyanate.

EXAMPLE 5—BUILDING PANEL

A building panel of the type described in U.S. Pat. No. 4,037,377 was prepared utilizing the polyurethane foam forming ingredients of Example 4. The resulting panel, 8'3" long; 2" thick; 24" wide, was enclosed in 20 gauge galvanized steel facing sheets. The rigid polyurethane foam itself was tested for fire properties by peeling away one of the metal skins and exposing the remaining polyurethane foam core in an ASTM E84 fire test. The exposed foam core was sanded until smooth, as is normal in such fire testing.

A similar building panel was tested without removing either metal skin. The results of the ASTM E84 test are set forth in Table 3.

TABLE 3

| ASTM E84 TESTS | Flame Spread | Smoke Generation |
|---|---|---|
| Foam Core - Foam Exposed | | |
| Test A | 23 | 99 |
| Test B | 20 | 107 |
| Test C | 20 | 100 |
| Rating | 20 | 100 |
| Foam Panel - Both Metal Liners Retained | | |
| Test D | 18 | 19 |
| Test E | 20 | 12 |
| Test F | 18 | 13 |
| Rating | 20 | 15 |

It will be observed that the exposed foam alone (without the covering metal skin) achieves a flame spread less than 25 and a smoke generation of 100 in the ASTM E84 test. When the panel was tested (two incombustible skins separated by a foamed-in-place rigid polyurethane foam core), the flame spread was less than 25 and the smoke generation was less than 25, specifically, the smoke generation was 15.

EXAMPLE 6—PREPARATION OF DIGESTION PRODUCT

Two moles of diethylene glycol and one mole of dimethyl glutarate are mixed and heated to 320°–330° F. Methanol is recovered as a vapor as the ingredients are further heated to 440° F. to produce a transesterification glutarate having an —OH value of 365±5.

One hundred pounds of the glutarate is combined with 63 pounds of polyethylene terephthalate photographic film chips and heated at 420°±10° F. for six hours. The final acid value is less than 3. The final —OH value is 220±10. The viscosity is 5,000±1,000 CPS at 70° F. (Number 3 spindle).

We claim:

1. A method for making rigid polyurethane foam which comprises combining
   (a) an organic polyisocyanate;
   (b) an organic polyol;
   (c) a halogenated alkane blowing agent;
   (d) a surfactant;
   (e) a catalyst for the reaction of —OH and —NCO radicals;
   wherein from 5 to 30 percent of the weight of the said organic polyol is a digestion product obtained by
   digesting polyalkylene terephthalate having a molecular weight greater than 15,000 in a reactive solvent selected from the class consisting of organic diols and triols having a molecular weight from 62 to 500 until the digestion product is soluble in acetone at room temperature;
   and recovering a resulting rigid polyurethane foam which has a lower overall density than a corresponding polyurethane foam made from the same ingredients except for the said digestion product and which foam exhibits equivalent or superior shear strength and compressive strength when compared to the corresponding rigid polyurethane foam of the same overall density made from the same ingredients except for the said digestion product.

2. A fire retardant polyurethane foam prepared by the process of claim 1 wherein:
   the said organic polyol comprises at least 50 percent by weight of a halogenated polyol selected from the class consisting of chlorinated or brominated polyethers or polyesters;
   and the resulting rigid polyurethane foam has a lower flame spread rating and a lower smoke generation than a corresponding rigid polyurethane foam of the same overall density fabricated from the same ingredients except for the said digestion product.

3. In a building construction panel having two incombustible skins separated by a foamed-in-place rigid polyurethane foam core, the improvement comprising the said foam core being the fire retardant polyurethane foam of claim 2 and wherein the resulting panel has a flame spread less than 25 and a smoke generation less than 100 in ASTM E84 test.

4. The panel of claim 3 wherein the smoke generation is less than 25.

* * * * *